United States Patent [19]

Wang et al.

[11] Patent Number: 5,296,424
[45] Date of Patent: Mar. 22, 1994

[54] SYSTEM OF DIELECTRIC CERAMIC COMPOSITIONS SUITABLE FOR MICROWAVE APPLICATIONS

[75] Inventors: Da Y. Wang, Lexington, Mass.; Burton W. MacAllister, Hudson, N.H.; Daniel T. Kennedy, Burlington; Joanne Browne, Malden, both of Mass.; Kazumasa Umeya, Chishirodai, Japan

[73] Assignee: GTE Control Devices Incorporated, Standish, Me.

[21] Appl. No.: 872,276

[22] Filed: Apr. 22, 1992

[51] Int. Cl.$^5$ ............................................. C04B 35/46
[52] U.S. Cl. ..................................... 501/138; 501/139
[58] Field of Search ........................ 501/137, 138, 139

[56] References Cited

U.S. PATENT DOCUMENTS 5,128,289 7/1992 Wilson ............................... 501/138

FOREIGN PATENT DOCUMENTS 0497228 8/2992 European Pat. Off. .
2165806 7/1987 Japan .
1201069 8/1989 Japan .

Primary Examiner—Mark L. Bell
Assistant Examiner—Deborah Jones
Attorney, Agent, or Firm—Martha A. Finnegan

[57] ABSTRACT

A system of dielectric ceramic compositions suitable for various microwave applications. The system comprises a plurality of stoichiometrically-related compositions, each composition having its own particular set of dielectric properties and consisting essentially of a sintered mixture represented by the general formula:

$$BaTi_{4-w}M_wO_9-xZn_2TiO_4-yBaO-zTa_2O_5$$

wherein M is at least one type of metal and $0.0 \leq w \leq$ about 0.05 and wherein x, y, and z are molar fractions of respective components with values within the following respective ranges: $0.0 \leq x \leq$ about 0.45; about $0.01 \leq y \leq$ about 0.20; and $0.0 \leq z \leq$ about 0.10.

17 Claims, 5 Drawing Sheets

SYSTEM OF DIELECTRIC CERAMIC COMPOSITIONS SUITABLE FOR MICROWAVE APPLICATIONS

BACKGROUND OF THE INVENTION

The present invention relates generally to systems of dielectric ceramic compositions suitable for microwave applications and more particularly to systems of dielectric ceramic compositions suitable for use as dielectric resonators designed to be operated in a frequency range of microwaves for telecommunication applications.

Existing dielectric ceramic compositions suitable for microwave dielectrics are generally capable of being categorized into the following systems of compositions: (1) the $BaO\text{-}TiO_2$ system; (2) the $ZrO_2\text{-}SnO_2\text{-}TiO_2$ system; (3) the perovskite-type complex oxide system; (4) $BaO\text{-}Nd_2O_3\text{-}TiO_2$ system; (5) $BaO\text{-}Sm_2O_3\text{-}TiO_2$ system; and (6) the (CaSrBa) Zirconate system.

In *Journal of Materials Science* Vol. 6, pp. 1214-1226 (1971), W. Heywang discloses doped barium titanates having utility as dielectrics possessing an extremely high dielectric constant.

In *Journal of The American Ceramic Society*, Vol. 57, No. 10, pp. 450-453 (October 1974), H. M. O'Bryan, Jr. et al. disclose their investigations of the dielectric properties of ceramics in the $TiO_2$-rich region of the $BaO\text{-}TiO_2$ system. In particular, the authors describe a new $BaO\text{-}TiO_2$ compound, $Ba_2Ti_9O_{20}$, in the composition range between $BaTi_4O_9$ and $TiO_2$. This new compound, which exhibits temperature-stable high permittivity and low microwave loss, is said to be obtained when calcining and sintering conditions are controlled carefully.

In *Materials Research Bulletin*, Vol. 16, No. 11, pp. 1455-1463 (1981), G. Wolfram et al. disclose the existence range, structural and dielectric properties of $Zr_xTi_ySn_zO_4$ ceramics wherein $x+y+z=2$. According to the authors, ceramic samples in the system $ZrO_2\text{-}TiO_2\text{-}SnO_2$ were prepared in order to investigate the existence range of a homogeneous phase $Zr_xTi_ySn_zO_4$ with $x+y+z=2$. Lattice parameters, dielectric properties and thermal expansion were determined. A homogeneous solid solution phase was found in part of the compisition diagram. Its crystal structure is isomorphous with $ZrTiO_4$. The unusual variation of the lattice parameters with the Sn content is discussed and the range of compositions suitable for dielectric resonators is defined.

In *Journal of The American Ceramic Society*, Vol. 67, C59-61 (1984). H. Tamura et al. disclose an improved high-Q dielectric resonator with a complex perovskite structure formed from $Ba(Zn_{\frac{1}{3}}Ta_{\frac{2}{3}})O_3\text{-}BaZrO_3$. The authors also disclose that both sintering and crystallization of $Ba(Zn,Ta)O_3\text{-}BaZrO_3$ were accelerated as compared to that for $Ba(Zn,Ta)O_3$ alone and that the microwave Q value was also improved.

In "Microwave Dielectric Materials," *Ceramic Dielectrics: Composition, Processing, and Properties* edited by Hung Ling and Man Yan, Am. Ceramic Soc. (1988), K. Wakino et al. discuss the low temperature characteristics and the third harmonic distortion levels of microwave dielectrics in connection with the anharmonic terms in the crystal's Hamiltonian.

In U.S. Pat. No. 4,242,213, issued Dec. 30, 1980 with inventors H. Tamura et al., a system of dielectric ceramic compositions based on magnesium, calcium and rare earth metal titanates is disclosed. Specifically, there is disclosed a dielectric ceramic composition for microwave applications consisting essentially of a sintered mixture represented by the general formula:

$$(1-x)MgTiO_3\text{-}x(Ca_{1-y}Me_y)TiO_3$$

wherein Me is at least one rare earth element selected from the group of Y, La, Ce, Pr, Nd, Pm, Sm, Eu, Gd, Tb, Dy, Ho, Er, Tm, Yb and Lu, and wherein x and y are molar fractions of respective components and take values within the following respective ranges: $0.03 \leq x \leq 0.15$, $0.001 \leq y \leq 0.06$. The composition is said to be a fine-grained, dense ceramic with high permittivity, high quality factor and small temperature coefficient of resonance frequency.

One disadvantage associated with many of the systems of compositions described above is that they require substantial quantities of expensive elements, such as Sm, Sr, Ni, Co, and Zr.

Another disadvantage associated with many of the systems of compositions described above is that they are incapable of accommodating appreciable levels of impurities without incurring debilitating losses in dielectric properties.

Still another disadvantage associated with many of the systems of compositions described above is that they are rigidly dependent upon achieving specific stoichiometries which, in many instances, are difficult to obtain.

Still yet another disadvantage associated with many of the systems of compositions described above is that they do not include constituent compositions whose respective dielectric properties, such as temperature coefficient of resonant frequency and dielectric loss, differ substantially. As a result, such systems are frequently limited to use in a narrow range of environments wherein the dielectric properties of the constituent compositions are acceptable. This problem is illustrated by the situation in which the compositions of a given system are intended for use as microwave resonators. Where the constituent compositions of the system have similar dielectric properties, they are often only useful as microwave resonators when a single type of material, e.g., steel, nickel, or aluminum, is used to encapsulate the composition. On the other hand, it can readily be appreciated that if such a system were to include constituent compositions whose dielectric properties differed substantially, the range of suitable encapsulating materials would probably be increased as different compositions would be optimally suited for use with different types of encapsulating materials.

SUMMARY OF THE INVENTION

The present invention relates to a novel system, i.e., a class, of dielectric ceramic compositions suitable for microwave applications. A principal feature of the present system is that it includes a plurality of stoichiometrically-related compositions which possess different dielectric properties and are, therefore, optimally adapted for different applications.

Accordingly, in one aspect, the present invention is directed to a dielectric ceramic composition suitable for microwave applications consisting essentially of a mixture represented by the general formula:

$$BaTi_{4-w}M_wO_9\text{-}xZn_2TiO_4\text{-}yBaO\text{-}zTa_2O_5$$

wherein M is at least one type of metal and $0.0 \leq w \leq$ about 0.05 and wherein x, y, and z are molar fractions of respective components with values within the following respective ranges:

$0.0 \leq x \leq$ about 0.45; about $0.01 \leq y \leq$ about 0.20; and $0.0 \leq z \leq$ about 0.10.

In another aspect, the present invention is directed to a system comprising at least two different dielectric ceramic compositions of the type described above which possess sufficiently different dielectric properties to permit their use for different microwave applications.

In still another aspect, the present invention is directed to a technique for varying one or more of the dielectric properties of a given composition of the type described above, the technique comprising modulating one or more of the molar fractions of the respective components of the composition within the above-defined ranges.

BRIEF DESCRIPTION OF THE DRAWINGS

For a better understanding of the present invention, together with certain objects, advantages, and capabilities thereof, reference is made to the following Description and appended claims, together with the Drawings, in which:

DETAILED DESCRIPTION OF PREFERRED EMBODIMENTS

The present application describes a system, i.e., a class, of dielectric ceramic compositions suitable for microwave applications. A principal feature of the present system is that it includes a plurality of stoichiometrically-related compositions which possess different dielectric properties and are, therefore, optimally adapted for different applications. According to the teachings presented herein, each of the compositions of the present system consists essentially of a mixture represented by the general formula:

wherein M is at least one type of metal with $0.0 \leq w \leq$ about 0.05 and wherein x, y, and z are molar fractions of respective components with values within the following respective ranges:

$0.0 \leq x \leq$ about 0.45; about $0.01 \leq y \leq$ about 0.20; and $0.0 \leq z \leq$ about 0.10.

The system of dielectric ceramic compositions described above can be thought of as comprising a pair of sub-classes, the first sub-class being defined by the family of compositions wherein z equals zero, the second sub-class being defined by the family of compositions wherein z is greater than zero and less than or equal to about 0.10. The principal differences between the compositions of the first sub-class and the compositions of the second sub-class are as follows: (1) The compositions of the first sub-class are typically about one-half as expensive to manufacture as the compositions of the second sub-class; and (2) The compositions of the second sub-class typically have a more desirable thermal expansion coefficient than the compositions of the first sub-class, i.e., it is possible in many instances to modulate the relative molar fractions of the components of the second sub-class to obtain compositions having zero or near zero temperature/frequency drift.

Preferred ranges of x and y for the first sub-class of compositions are between about 0.270 and about 0.40 for x and between about 0.05 and about 0.15 for y. Preferred ranges of x, y, and z for the second sub-class of compositions are between about 0.270 and about 0.40 for x, between about 0.05 and about 0.15 for y, and between about 0.05 and about 0.08 for z.

M, as represented above in the general formulation, typically comprises one or more metals, the primary function of which is to serve as a colorant for the composition (although, as will be seen below, the presence of M in a composition also has some incidental effect on the dielectric properties of the composition). M may be one or more metals selected from the group consisting of Sr, Ca, Al, Na, Ni, Sm, Nd, and Mn.

The compositions described herein may be fabricated according to the following general technique: Appropriate amounts of $BaCO_3$ powder, $TiO_2$ powder, ZnO powder, $Ta_2O_5$ powder, and an M-containing powder (if the resultant composition is to include a metal M of the type described above) are milled with alumina or flint stone-type milling media for 6-18 hours in deionized water. The powder mixture is then dried in an oven for 2-5 hours at 120-150 degrees Celsius. The dried powder mixture is then calcined for 2-10 hours at 950-1150 degrees Celsius, preferably for 5-10 hours at 1050-1110 degrees Celsius. The calcined powder mixture is then milled again and dried, preferably using deionized water and alumina or flint stone milling media. A binder, such as polyvinyl alcohol, is then added to the powder mixture, and the sample is then shaped into its desired form either by a dry press method or by a hydrostatic press method. To control the actual shape of the sample, the sample may be mechanically machined at the green stage or after sintering. Sintering is then performed for 2-10 hours at 1220-1350 degrees Celsius, preferably for 3-5 hours at 1250 degrees Celsius. It should be noted that a sintering aid, such as BaO, is not required in the present technique. It is believed that this is so, in part, because BaO is, in many instances, added directly to the composition in quantities far outweighing that which would ordinarily be present if BaO were to be used as a sintering aid.

The following Examples are presented to enable one of ordinary skill in the art to more clearly understand and practice the present invention. These Examples should be construed merely as being illustrative and representative of the present invention and should not be construed as a limitation on the scope of the present invention.

EXAMPLE 1

A composition of the formula $((BaTi_{3.98926}Mn_{0.01074}O_9) + 0.28606(Zn_2TiO_4) + 0.06474(Ta_2O_5) + 0.00372(BaO))$ was prepared by adding 74.96 g of $BaCO_3$ powder, 129.24 g of $TiO_2$ powder, 17.62 g of ZnO powder, 0.35 g of $MnO_2$ powder, and 10.83 g of $Ta_2O_5$ powder to a one liter HDPE jar containing about 400 g of flint stones. Deionized water in an amount of 550 ml was added to the powders, and the jar was shaken until a slurry formed. An additional amount of 500 g of flint stones was then added to the slurry. The jar was placed on a rolling mill for 9 hours at an indicator speed of 140.

The jar was then removed from the mill and filled to the top with deionized water. The jar was rolled again for one hour and the slurry was drained into an evaporating dish. The jar was then refilled with deionized water to about the level of the media, agitated, and the slurry was poured off again. This step was repeated. The media was then transferred into a plastic funnel with a coarse screen and washed with deionized water. After the media was cleaned and removed, the evaporating dish was placed in an air oven to dry overnight at 115 degrees Celsius. Because the powder mixture was not thoroughly dried overnight, the oven temperature was increased to 125 degrees Celsius and the powder mixture was left in the oven an additional four hours. The powder yield at this point was 229 g. The powder was then ground in the 1900 ml mortar and put into two crucibles, covered, and calcined as follows: (1) 3 hours at a temperature increasing from room temperature to 1080 degrees Celsius; (2) 3 hours at 1080 degrees Celsius; and (3) 2 hours at a temperature decreasing from 1080 degrees Celsius to 15 degrees Celsius.

After calcining, the powder (which at this point was down to 214 g) was added to a 1 liter HDPE jar containing 280 ml of deionized water and 900 g of flint stones. The slurry was rolled for 8 hours, and the container was again filled with deionized water, agitated, and decanted into an evaporating dish. After washing all of the powder in the container, the evaporating dish was covered and put in the oven to dry over the weekend at 100 degrees Celsius. After drying, the powder was reweighed and transferred to the 1900 ml mortar. At this point, the powder weight was 213 g. An amount of 29.8 ml of 15% polyvinyl alcohol solution was added to the powder and mixed in. The powder was then put back into the oven at 100 degrees Celsius for drying. The dried powder was then sieved through a 40 gauge sieve.

A 7 g sample of the powder was then pressed into a disc using a dry press technique. The disc was then sintered according to the following schedule: (1) 4 hours and 30 minutes at a temperature increasing from room temperature to 750 degrees Celsius; (2) 2 hours at 750 degrees Celsius; (3) 1 hour and 40 minutes at a temperature increasing from 750 degrees Celsius to 1250 degrees Celsius; (4) 3 hours at 1250 degrees Celsius; (5) 4 hours at a temperature decreasing from 1250 degrees Celsius to 800 degrees Celsius; and (6) 2 hours at a temperature decreasing from 800 degrees Celsius to 15 degrees Celsius.

EXAMPLE 2

A composition of the formula $((BaTi_4O_9) + 0.30205(Zn_2TiO_4) + 0.068358(Ta_2O_5) + 0.059813(BaO))$ was prepared by adding 77.081 g of $BaCO_3$ powder, 126.3427 g of $TiO_2$ powder, 18.1186 g of ZnO powder, 0.3396 g of $MnO_2$, and 11.1331 g of $Ta_2O_5$ powder to a one liter HDPE jar containing about 900 g of flint stones. Deionized water in an amount of 550 ml was added to the powders, and the jar was shaken until the contents were mixed together. The jar was then placed on a rolling mill for 10 hours at 78 rpm. The slurry was separated from the media and divided into two equal amounts placed on respective evaporating dishes. The slurry was dried in the dishes at 130 degrees Celsius during the day. The large agglomerates in the dishes were broken up with a pestle and the contents were then transferred to a pair of 250 ml ceramic crucibles. The crucibles were placed in a Lindberg furnace and calcined as follows: (1) 3 hours at a temperature increasing from room temperature to 1080 degrees Celsius; (2) 3 hours at 1080 degrees Celsius; and (3) 2 hours at a temperature decreasing from 1080 degrees Celsius to 15 degrees Celsius.

After calcining, it was found that the powder contained mostly hard agglomerates that had to be ground in the 400 ml mortar. The powder was then returned to the same 1 liter HDPE jar containing 900 g of flint stones. An amount of 275 ml of deionized water was added to the jar, and the jar was placed on the rolling mill at 78 rpm for 8 hours. The slurry was decanted from the jar into two evaporating dishes to dry overnight. The powder was then removed from the dishes and 28.98 ml of 15% polyvinyl alcohol solution was mixed thereto in a mortar. The mixture was then dried at 100 degrees Celsius. The dried powder was ground in a 1.9 l mortar and then sieved through a 40 gauge sieve. A disc was pressed from the powder using a dry press technique. The disc was then sintered according to the following schedule: (1) 4 hours and 30 minutes at a temperature increasing from room temperature to 750 degrees Celsius; (2) 2 hours at 750 degrees Celsius; (3) 1 hour and 40 minutes at a temperature increasing from 750 degrees Celsius to 1250 degrees Celsius; (4) 3 hours at 1250 degrees Celsius; (5) 4 hours at a temperature decreasing from 1250 degrees Celsius to 800 degrees Celsius; and (6) 2 hours at a temperature decreasing from 800 degrees Celsius to 15 degrees Celsius.

EXAMPLE 3

A composition of the formula $((BaTi_4O_9) + 0.285(Zn_2TiO_4))$ was prepared by adding 78.4629 g of $BaCO_3$ powder, 136.0937 g of $TiO_2$ powder, and 18.4434 g of ZnO powder to a one liter HDPE jar containing about 900 g of flint stones. Deionized water in an amount of 550 ml was added to the powders, and the jar was shaken until the contents were mixed together. The jar was then placed on a rolling mill for 9 hours at 78 rpm. The jar was removed from the mill, and the slurry was separated from the media and placed into two evaporating dishes. The slurry was dried at 130 degrees Celsius.

The dried powder was put into two 250 ml ceramic crucibles, placed in a Lindberg furnace, and calcined as follows: (1) 3 hours at a temperature increasing from room temperature to 1080 degrees Celsius; (2) 3 hours at 1080 degrees Celsius; and (3) 2 hours at a temperature decreasing from 1080 degrees Celsius to 15 degrees Celsius. After calcining, the powder was ground in a 1.9 l mortar and transferred to a 1 liter HDPE jar containing 900 g of flint stones. An amount of 275 ml of deionized water was added to the jar, and the jar was rolled for 8 hours. After rolling, the slurry was separated from the media into two large evaporating dishes and dried overnight at 100 degrees Celsius. An amount of 21 ml of 15% polyvinyl alcohol stock solution was added to the dried powder to make a powder containing 1.5% polyvinyl alcohol. To make a workable slurry, an amount of 80 ml of deionized water was added to the powder. The slurry was mixed with a mortar and pestle for 30 minutes and then transferred to a teflon dish for drying overnight at 100 degrees Celsius.

The dried powder was put into a 1.9 l mortar, ground and sieved through a 40 gauge sieve. A disc was pressed using a dry press technique and sintered according to the following schedule: (1) 4 hours and 30 minutes at a temperature increasing from room temperature to 750 degrees Celsius; (2) 2 hours at 750 degrees Celsius; (3) 1 hour and 40 minutes at a temperature increasing from 750 degrees Celsius to 1250 degrees Celsius; (4) 3 hours at 1250 degrees Celsius; (5) 5 hours at a temperature decreasing from 1250 degrees Celsius to 800 degrees; and (6) 2 hours at a temperature decreasing from 800 degrees Celsius to 15 degrees Celsius.

EXAMPLE 4

A composition of the formula $((BaTi_4O_9)+0.30(Zn_2TiO_4))$ was prepared by adding 77.9786 g of $BaCO_3$ powder, 135.7271 g of $TiO_2$ powder, and 19.2943 g of ZnO powder to a one liter HDPE jar containing about 900 g of flint stones. Deionized water in an amount of 500 ml was added to the powders, and the jar was shaken until the contents were mixed together. The jar was then placed on a rolling mill for 10 hours at 78 rpm. The jar was removed from the mill, and the slurry was separated from the media and dried at 110 degrees Celsius.

After drying, the powder was put into a pair of 250 ml alumina crucibles and calcined for 3 hours at 1080 degrees Celsius. The powder was then removed and ground in a 1.9 l mortar. The powder was then transferred to a 1 liter HDPE jar containing 900 g of flint stones. An amount of 275 ml of deionized water was added to the jar, and the jar was rolled for 8 hours at 78 rpm.

The slurry was separated from the media and dried in an evaporating dish at 130 degrees Celsius. The dried powder was transferred to a teflon dish, and an amount of 20.5 ml of 15% polyvinyl alcohol solution was added thereto. The mixture was then left to dry.

The dried powder was ground in a 1.9 l mortar and sieved through a 40 gauge. A 7 g disc was pressed using a dry press technique and sintered according to the following schedule: (1) 4 hours and 30 minutes at a temperature increasing from room temperature to 750 degrees Celsius; (2) 2 hours at 750 degrees Celsius; (3) 1 hour and 40 minutes at a temperature increasing from 750 degrees Celsius to 1250 degrees Celsius; (2) 2 hours at 1250 degrees Celsius; (5) 5 hours at a temperature decreasing from 1250 degrees Celsius to 800 degrees; and (6) 2 hours at a temperature decreasing from 800 degrees Celsius to 15 degrees Celsius.

EXAMPLE 5

A composition of the formula $((BaTi_{3.99}Mn_{0.01}O_9)+0.285(Zn_2TiO_4))$ was prepared by adding 78.570 g of $BaCO_3$ powder, 135.9614 g of $TiO_2$ powder, 18.4686 g of ZnO powder, and 0.3461 g of $MnO_2$ powder to a one liter HDPE jar containing about 900 g of flint stones. Deionized water in an amount of 550 ml was added to the powders, and the jar was shaken until the contents were mixed together. The jar was then placed on a rolling mill for 10 hours at 78 rpm. The jar was removed from the mill, and the slurry was separated from the media into two evaporating dishes and one teflon dish and dried at 130-140 degrees Celsius.

After drying, the powder was removed from the dishes and ground lightly to break up agglomerates which had formed. The powder was then transferred to a pair of 250 ml alumina crucibles and calcined in a Lindberg furnace as follows: (1) 3 hours at a temperature increasing from room temperature to 1080 degrees Celsius; (2) 3 hours at 1080 degrees Celsius; and (3) 2 hours at a temperature decreasing from 1080 degrees Celsius to 15 degrees Celsius.

After calcining, the powder was removed from the crucibles and ground in a 1.9 l mortar. The powder was then transferred to a 1 liter HDPE jar containing 900 g of flint stones. An amount of 275 ml of deionized water was added to the jar, and the jar was rolled for 8 hours at 78 rpm. The slurry was separated from the media and dried. The dried powder was transferred to a 1.9 l mortar, and an amount of 21.1 ml of polyvinyl alcohol solution was added thereto. To reduce the viscosity of the mixture, an amount of 70 ml of deionized water was also added. The slurry was mixed for 20 minutes with mortar and pestle and then transferred to evaporating dishes for drying at 100 degrees Celsius. The powder was then sieved through a 40 gauge sieve.

A 7 g disc was pressed using a dry press technique and were sintered according to the following schedule: (1) 4 hours and 30 minutes at a temperature increasing from room temperature to 750 degrees Celsius; (2) 2 hours at 750 degrees Celsius; (3) 1 hour and 40 minutes at a temperature increasing from 750 degrees Celsius to 1250 degrees Celsius; (4) 3 hours at 1250 degrees Celsius; (5) 5 hours at a temperature decreasing from 1250 degrees Celsius to 800 degrees; and (6) 2 hours at a temperature decreasing from 800 degrees Celsius to 15 degrees Celsius.

EXAMPLE 6

A composition of the formula $((BaTi_{3.99}Mn_{0.01}O_9)+0.270(Zn_2TiO_4))$ was prepared by adding 78.9436 g of $BaCO_3$ powder, 136.129 g of $TiO_2$ powder, 17.5798 g of ZnO powder, and 0.3478 g of $MnO_2$ powder to a one liter HDPE jar containing about 900 g of flint stones. Deionized water in an amount of 550 ml was added to the jar. The jar was shaken by hand until the contents were mixed, and the jar was then placed on a rolling mill for 10 hours at 78 rpm. The slurry was separated from the media and transferred to a pair of evaporating dishes and a teflon dish where it was dried at 130 degrees Celsius. The powder was then removed from the dishes and ground lightly to break up the agglomerates present therein. The powder was then transferred to a pair of 250 ml alumina crucibles and calcined in a Lindberg furnace as follows: (1) 3 hours at a temperature increasing from room temperature to 1080 degrees Celsius; (2) 3 hours at 1080 degrees Celsius; and (3) 2 hours at a temperature decreasing from 1080 degrees Celsius to 15 degrees Celsius.

After calcining, the powder was removed from the crucibles and ground in a 1.9 l mortar. The powder was then transferred to a 1 liter HDPE jar containing 900 g of flint stones. An amount of 275 ml of deionized water was added to the jar, and the jar was rolled for 8 hours at 78 rpm. The slurry was separated from the media and dried overnight in three evaporating dishes at 100 degrees Celsius. The dried powder in the evaporating dishes was then broken up a large pestle. The powder was transferred to a 1.9 l mortar, and an amount of 21.7 ml of polyvinyl alcohol solution was added thereto. Deionized water in an amount of 70 ml was also added, and the slurry was mixed for 20 minutes. The slurry was dried by laying a 5 mm sheet of teflon in a large evaporating dish, pouring the slurry onto the sheet and drying the powder in an oven at 100 degrees Celsius.

The powder, which at this point was in the form of a cake, was then ground in the 1.9 l mortar and sieved through a 40 gauge sieve. A 7 g disc was pressed using a dry press technique, and the disc was sintered according to the following schedule: (1) 4 hours and 30 minutes at a temperature increasing from room temperature to 750 degrees Celsius; (2) 2 hours at 750 degrees Celsius; (3) 1 hour and 40 minutes at a temperature increasing from 750 degrees Celsius to 1250 degrees Celsius; (4) 3 hours at 1250 degrees Celsius; (5) 5 hours at a temperature decreasing from 1250 degrees Celsius to 800 degrees; and (6) 2 hours at a temperature decreasing from 800 degrees Celsius to 15 degrees Celsius.

EXAMPLE 7

A composition of the formula $((BaTi_{3.98}Mn_{0.02}O_9) + 0.285(Zn_2TiO_4))$ was prepared by adding 78.444 g of $BaCO_3$ powder, 135.4259 g of $TiO_2$ powder, 18.439 g of ZnO powder, and 0.69118 g of $MnO_2$ powder to a one liter HDPE jar containing about 900 g of flint stones. Deionized water in an amount of 550 ml was added to the jar. The jar was shaken by hand until the contents were mixed, and the jar was then placed on a rolling mill for 10 hours at 78 rpm. The slurry was separated from the media and transferred to a pair of evaporating dishes and a teflon dish where it was dried at 130 degrees Celsius. The powder was then removed from the dishes and ground lightly to break up the agglomerates present therein. The powder was then transferred to a pair of 250 ml alumina crucibles and calcined in a Lindberg furnace as follows: (1) 3 hours at a temperature increasing from room temperature to 1080 degrees Celsius: (2) 3 hours at 1080 degrees Celsius: and (3) 2 hours at a temperature decreasing from 1080 degrees Celsius to 15 degrees Celsius.

After calcining, the powder was removed from the crucibles and ground in a 1.9 l mortar. The powder was then transferred to a 1 liter HDPE jar containing 900 g of flint stones. An amount of 275 ml of deionized water was added thereto, and the jar was placed on the rolling mill for 8 hours at 78 rpm. After milling, a small amount of deionized water was added to the slurry to reduce its viscosity, and the slurry was separated from the media and put into three evaporating dishes to dry overnight at 130 degrees Celsius.

The dried powder was broken up in the evaporating dishes with a large pestle. The powder was then mixed with 21.1 ml of 15% polyvinyl alcohol stock solution and 70 ml of deionized water for 20 minutes. The slurry was dried on a 5 mm teflon sheet (held by an evaporating dish) in an air oven at 100 degrees Celsius. After drying, the cake was ground in the 1.9 l mortar and sieved through a 40 gauge sieve.

A 7 g disc was pressed using a dry press technique and was sintered the next day according to the following schedule: (1) 4 hours and 30 minutes at a temperature increasing from room temperature to 750 degrees Celsius: (2) 2 hours at 750 degrees Celsius: (3) 1 hour and 40 minutes at a temperature increasing from 750 degrees Celsius to 1250 degrees Celsius: (4) 3 hours at 1250 degrees Celsius; (5) 5 hours at a temperature decreasing from 1250 degrees Celsius to 800 degrees; and (6) 2 hours at a temperature decreasing from 800 degrees Celsius to 15 degrees Celsius.

The dielectric constant, Qf value, temperature coefficient of resonant frequency ($\tau_f$), and second order temperature coefficient ($\beta$) were measured for each of the compositions described above as well as for additional compositions made according to the teachings of the present disclosure. The results of these measurements are presented below in Tables 1-8. The dielectric constants and Qf values given below were measured at room temperature (except for the Qf values in parentheses, which were measured at 100 degrees Celsius). The temperature coefficients are for T = 40 degrees Celsius.

TABLE 1

| Composition | K | Qf(GHz) | $\tau_f$(ppm/ deg C.) | $\beta$(ppb/ (deg C.)$^2$) |
|---|---|---|---|---|
| Comp. 1* | 36.1 | 18,500 (6,000) | 1.1 | 9.9 |
| Comp. 1* + 0.03 w % Al | 36.3 | 16,400 (5,000) | 1.0 | 12.1 |
| Comp. 1* + 0.093 w % Ti | 35.3 | 17,500 (5,000) | 1.6 | 10.9 |
| Comp. 1* + 0.187 w % Ti | 36.3 | 14,000 (5,000) | 0.97 | 10.9 |
| Comp. 1* + 0.280 w % Ti | 36.3 | 16,000 (5,000) | 1.04 | 10.9 |
| Comp. 1* + 0.04825 Ba | 34.7 | 41,900 (37,500) | 1.4 | 0.6 |
| Comp. 1* + 0.05105 Ba + 0.108735 Ti | 34.7 | 33,800 (20,000) | −0.7 | 12.2 |

*Comp. 1 = $((BaTi_{3.98926}Mn_{0.01074}O_9) + 0.28606(Zn_2TiO_4) + 0.06474(Ta_2O_5) + 0.00372(BaO))$

TABLE 2

| Composition | K | Qf(GHz) | $\tau_f$(ppm/ deg C.) | $\beta$(ppb/ (deg C.)$^2$) |
|---|---|---|---|---|
| Comp. 2* | 35.1 | 31,400 (18,000) | 0.94 | 2.6 |
| Comp. 2* + 0.03 Ba | 34.8 | 39,400 (22,500) | 3.4 | −6.3 |
| Comp. 2* + 0.09 Ba | 35.0 | 42,100 (27,500) | 4.2 | −9.4 |
| Comp. 2* + 0.05 Ba | 35.0 | 43,300 (32,500) | 4.8 | −12.7 |
| Comp. 2* + 0.06 Ba | 34.8 | 43,000 (33,000) | 5.5 | −16.2 |
| Comp. 2* + 0.07 Ba | 34.9 | 45,000 (37,000) | 6.3 | −19.2 |
| Comp. 2* + 0.09 Ba | 34.8 | 38,300 (29,000) | 8.8 | −18.7 |

*Comp. 2 = $((BaTi_4O_9) + 0.28732(Zn_2TiO_4) + 0.065024(Ta_2O_5) + 0.056896(BaO))$

TABLE 3

| Composition | K | Qf(GHz) | $\tau_f$(ppm/ deg C.) | $\beta$(ppb/ (deg C.)$^2$) |
|---|---|---|---|---|
| Comp. 3* | 34.9 | 44,000 (38,500) | 0.50 | 4.8 |
| Comp. 3* + 0.0053 Ba | 35.1 | 44,000 (37,000) | 1.0 | 2.7 |
| Comp. 3* + 0.07 Ba | 35.4 | 43,100 | 1.4 | −18 |
| Comp .3* + 0.08 Ba | 35.4 | 43,200 (39,000) | 4.8 | −90.3 |
| Comp. 3* + 0.09 Ba | 35.5 | 43,400 (37,500) | 0.48 | 2.7 |

*Comp. 3 = $((BaTi_4O_9) + 0.30205(Zn_2TiO_4) + 0.068358(Ta_2O_5) + 0.059813(BaO))$

TABLE 4

| Composition | K | Qf(GHz) | $\tau_f$(ppm/ deg C.) | $\beta$(ppb/ (deg C.)$^2$) |
|---|---|---|---|---|
| Comp. 4* | 36.3 | 4,300 | | |
| Comp. 4* + 0.06 Ba | 35.4 | 18,600 | | |
| Comp. 4* + 0.07 Ba | 35.1 | 29,800 (9,000) | 1.9 | −18 |
| Comp. 4* + 0.08 Ba | 34.9 | 51,200 (40,000) | 0.99 | −17.6 |
| Comp. 4* + 0.09 Ba | 35.3 | 37,900 (30,000) | 3.7 | −17.1 |
| Comp. 4* + 0.10 Ba | 35.6 | 34,700 (34,000) | 6.0 | −18.6 |
| Comp. 4* + 0.14 Ba | 35.8 | 22,100 | 14.6 | −19.4 |
| Comp. 4* + 0.20 Ba | 37.1 | 14,200 | | |

*Comp. 4 = ((BaTi$_4$O$_9$) + 0.285(Zn$_2$TiO$_4$))

TABLE 5

| Composition | K | Qf(GHz) | $\tau_f$(ppm/ deg C.) | $\beta$(ppb/ (deg C.)$^2$) |
|---|---|---|---|---|
| Comp. 5* | 36.6 | 4,600 | | |
| Comp. 5* + 0.075 Ba | 35.0 | 36,400 (12,000) | 1.1 | −20.3 |
| Comp. 5* + 0.08 Ba | 34.7 | 47,100 (32,000) | 0.56 | −16.7 |
| Comp. 5* + 0.085 Ba | 34.9 | 51,300 (40,000) | 0.58 | −17.2 |
| Comp. 5* + 0.09 Ba | 35.0 | 38,500 (34,500) | 2.3 | −16.8 |
| Comp. 5* + 0.08 Sr | 34.7 | 28,700 (16,000) | 9.7 | −38.5 |
| Comp. 5* + 0.08 Ca | 33.2 | 7,000 | | |
| Comp. 5* + 0.10 Sr | 35.3 | 24,900 (26,000) | 36.6 | −118.2 |

*Comp. 5 = ((BaTi$_4$O$_9$) + 0.30(Zn$_2$TiO$_4$))

TABLE 6

| Composition | K | Qf(GHz) | $\tau_f$(ppm/ deg C.) | $\beta$(ppb/ (deg C.)$^2$) |
|---|---|---|---|---|
| Comp. 6* | 36.8 | 6,100 | | |
| Comp. 6* + 0.075 Ba | 34.6 | 48,800 (32,000) | 1.2 | −18.3 |
| Comp. 6* + 0.08 Ba | 35.2 | 47,500 (42,000) | 1.8 | −18.3 |
| Comp. 6* + 0.085 Ba | 34.8 | 43,800 (40,000) | 2.7 | −18.3 |
| Comp. 6* + 0.09 Ba | 36.1 | 39,300 (38,000) | 4.1 | −17.9 |

*Comp. 6 = ((BaTi$_{3.99}$Mn$_{0.01}$O$_9$) + 0.285(Zn$_2$TiO$_4$))

TABLE 7

| Composition | K | Qf(GHz) | $\tau_f$(ppm/ deg C.) | $\beta$(ppb/ (deg C.)$^2$) |
|---|---|---|---|---|
| Comp. 7* | 36.8 | 6,583 | | |
| Comp. 7* + 0.070 Ba | 35.0 | 47,500 (38,000) | 1.4 | −16.2 |
| Comp. 7* + 0.075 Ba | 34.9 | 46,000 (35,000) | 2.1 | −18.7 |
| Comp. 7* + 0.080 Ba | 35.0 | 41,240 (36,000) | 3.3 | −18.5 |
| Comp. 7* + 0.085 Ba | 35.5 | 38,300 (36,000) | 4.4 | −16.2 |
| Comp. 7* + 0.085 Ba | 36.3 | 4,560 | | |

*Comp. 7 = ((BaTi$_{3.99}$Mn$_{0.01}$O$_9$) + 0.270(Zn$_2$TiO$_4$))

TABLE 8

| Composition | K | Qf(GHz) | $\tau_f$(ppm/ deg C.) | $\beta$(ppb/ (deg C.)$^2$) |
|---|---|---|---|---|
| Comp. 8* | 36.5 | 6,312 | | |
| Comp. 8* + 0.08 Ba | 35.0 | 40,166 (37,000) | 2.7 | −17.0 |
| Comp. 8* + 0.085 Ba | 34.8 | 37,457 | 4.0 | −19.7 |
| | | (36,000) | | |

*Comp. 8 = ((BaTi$_{3.99}$Mn$_{0.02}$O$_9$) + 0.285(Zn$_2$TiO$_4$))

The following observations drawn from the data presented in Tables 1 through 8 are worth noting: First, as can be seen, for example, in Table 1, the presence of significant levels of impurities, such as aluminum and titanium, did not result in debilitating losses in the utility of the compositions as dielectric materials (although it did result in some minor changes in the dielectric properties of the respective compositions). These results suggest that the present compositions are capable of accommodating levels of impurities or other materials in quantities that exceed the typical impurity-background level of about 100 ppm.

Figure 1:
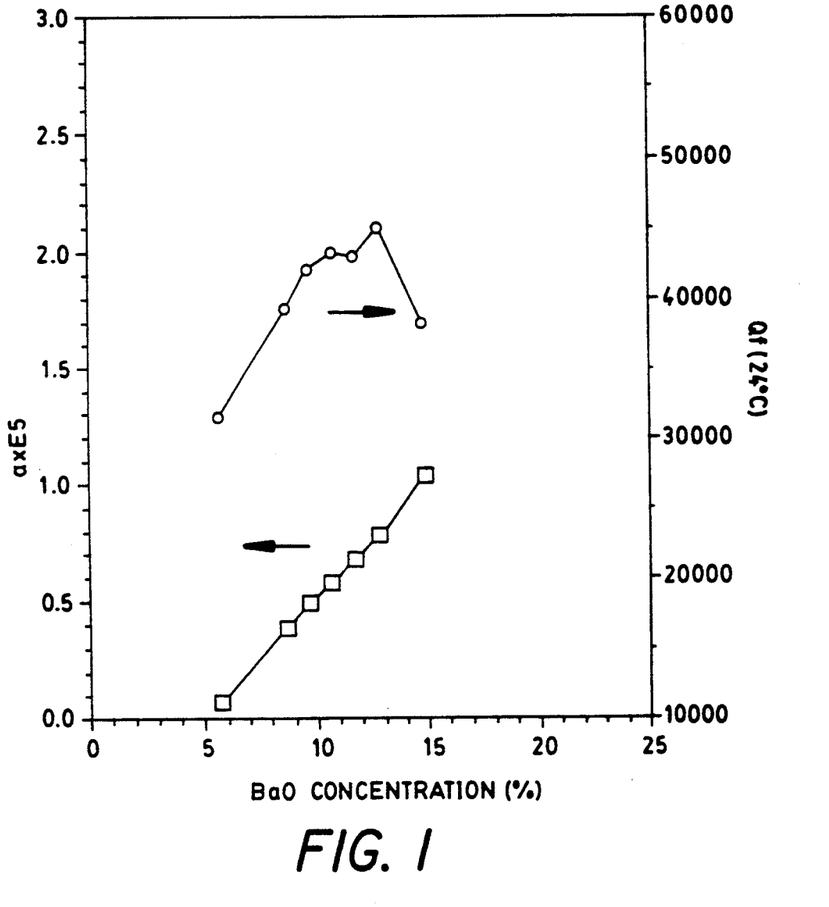
FIG. 1 is a graphic representation of the temperature coefficient and Qf plotted against BaO concentration for some of the compositions listed in Table 2.
Figure 2:
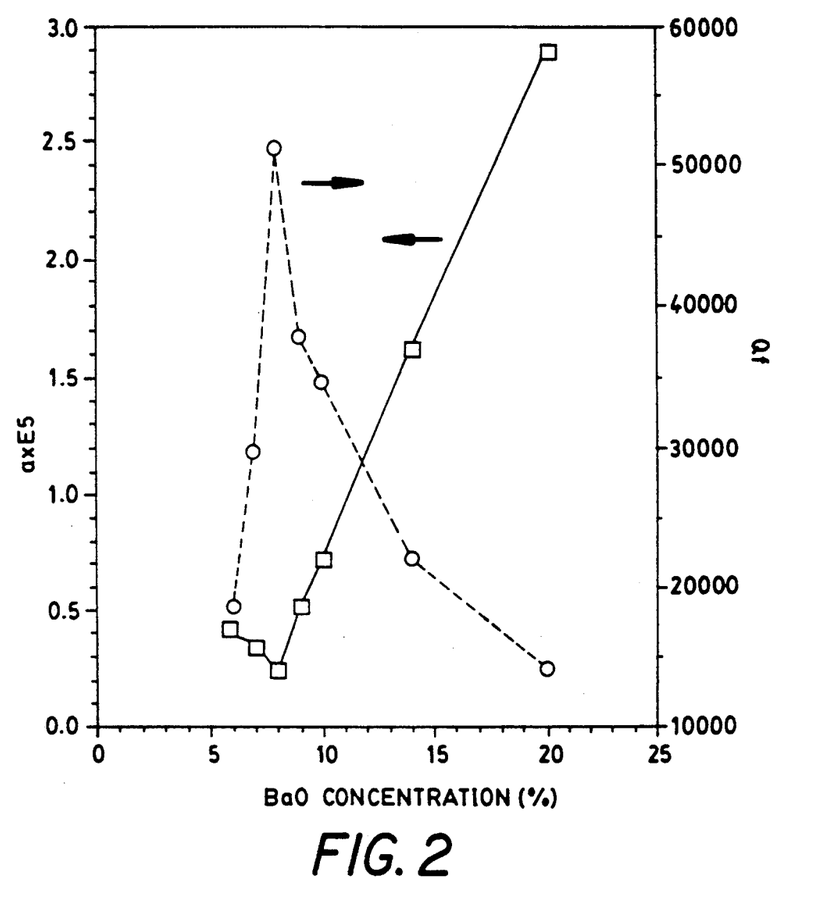
FIG. 2 is a graphic representation of the temperature coefficient and Qf plotted against BaO concentration for some of the compositions listed in Table 4.
Figure 3:
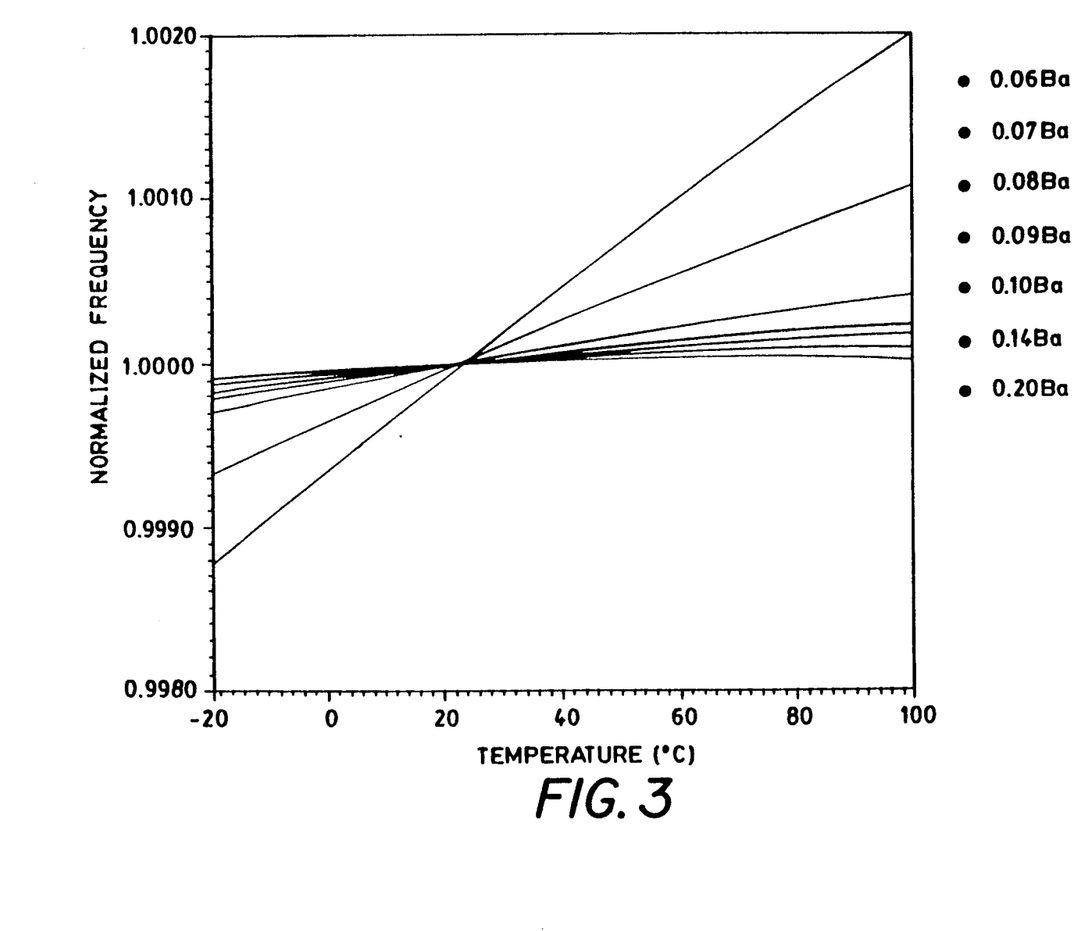
FIG. 3 is a graphic representation of the normalized resonate frequencies plotted against temperature for some of the compositions listed in Table 4.

Second, as can be seen, for example, in Tables 2 and 4, rather substantial changes in the dielectric properties of the compositions were induced by corresponding changes in the concentration of barium oxide in the respective compositions (it being understood that excess barium is, in practice, incorporated into the present compositions as BaO). FIGS. 1 and 2 graphically depict the dependence of the temperature coefficients and Qf values on the concentration of BaO in many of the samples of Tables 2 and 4, respectively. Similarly, FIG. 3 illustrates the effect that variations in BaO concentration had on the temperature-frequency curves of many of the samples of Table 4.

Third, as can be seen, for example, by comparing the data of Table 2 to that of Table 4, substantial changes in the dielectric properties of the present compositions (particularly the temperature coefficients of the respective compositions) were also caused by variations in the concentration of Ta$_2$O$_5$ in the present compositions.

Figure 4:
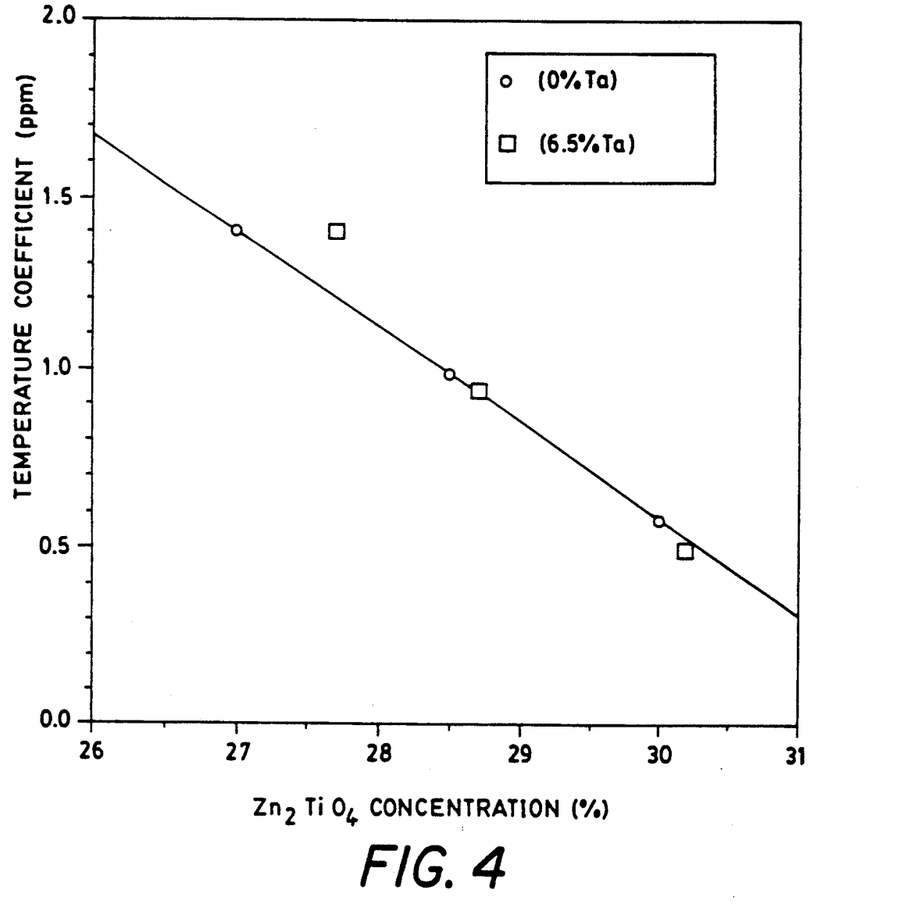
FIG. 4 is a graphic representation of the temperature coefficient plotted against $Zn_2TiO_4$ concentration for some of the compositions listed in Tables 1-5, 7 and 8.

Fourth, as can be seen by comparing the data for several of the samples in Tables 1 through 8, substantial changes in the dielectric properties of the present compositions (particularly the temperature coefficients of the respective compositions) were also caused by variations in the concentration of Zn$_2$TiO$_4$ in the present compositions. FIG. 4 graphically illustrates the dependence of the respective temperature coefficients on the concentration of Zn$_2$TiO$_4$. As can be seen from FIG. 4, a 1.0% increase in the concentration of Zn$_2$TiO$_4$ in the present compositions typically results in a corresponding decrease in the temperature coefficient of the compositions by 0.27 ppm.

Figure 5:
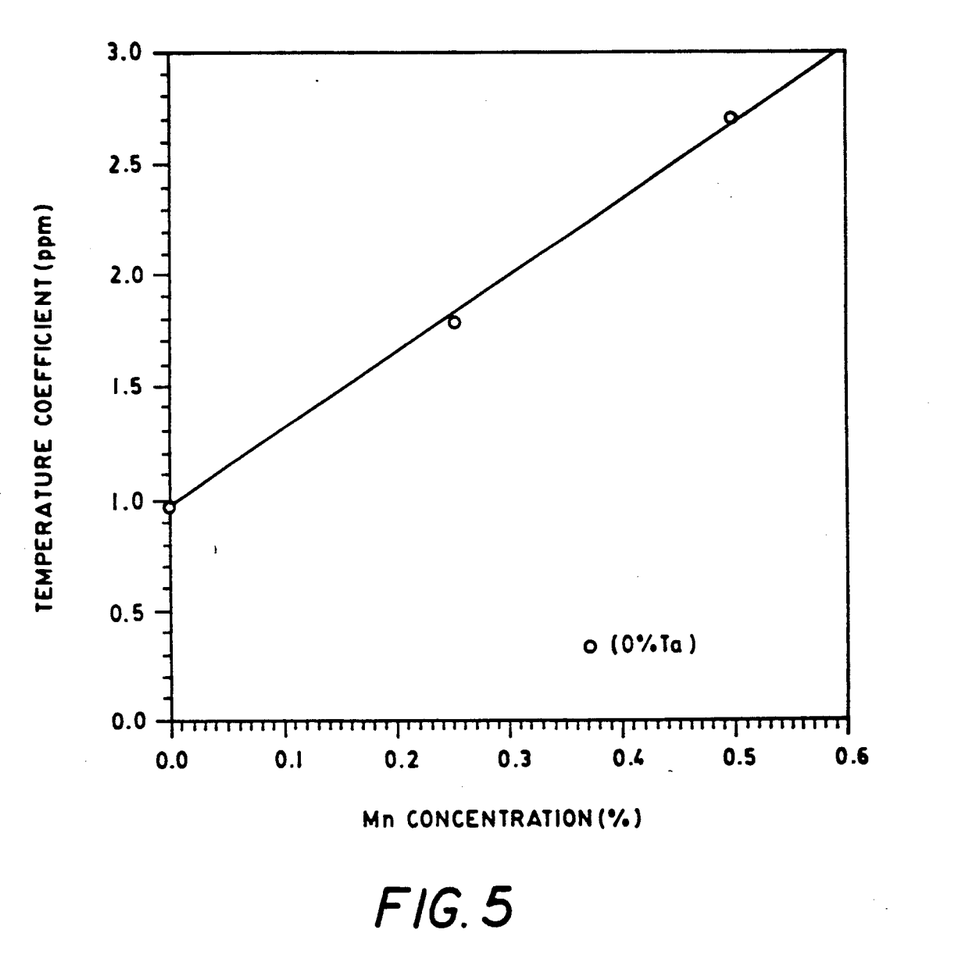
FIG. 5 is a graphic representation of the temperature coefficient plotted against Mn concentration for some of the compositions in Tables 4, 6, and 8.

Fifth, as can be seen by comparing the data of Tables 4, 6, and 8, changes in the dielectric properties of the present compositions were also caused by variations in the concentration of Mn in the present compositions. (Increases in the concentration of Mn in the present compositions also resulted in a change in the color of the respective compositions from a milky color to a dark brown color.) FIG. 5 graphically illustrates the relationship between the addition of Mn and the effect on the temperature coefficient in the present compositions. As can be seen from FIG. 5, each addition of 100 ppm of Mn resulted in a corresponding increase in the temperature coefficient by 0.66.

While there have been shown and described what are at present considered the preferred embodiments of the invention, it will be obvious to those skilled in the art that various changes and modifications can be made therein without departing from the scope of the invention as defined by the appended Claims.

What is claimed is:

1. A dielectric ceramic composition suitable for microwave applications consisting essentially of a mixture represented by the general formula:

$$BaTi_{4-w}M_wO_9\text{-}xZn_2TiO_4\text{-}yBaO\text{-}zTa_2O_5$$

wherein M is at least one metal and $0.0 \leq w \leq$ about 0.05 and wherein x, y, and z are molar fractions of respective components with values within the following respective ranges:

$0.0 \leq x \leq$ about 0.45; about $0.01 \leq y \leq$ about 0.20; and $0.0 \leq z \leq$ about 0.10.

2. The dielectric ceramic composition as claimed in claim 1 wherein M is at least one metal selected from the group consisting of Sr, Ca, Al, Na, Ni, Sm, Nd and Mn.

3. The dielectric ceramic composition as claimed in claim 2 wherein M is Mn.

4. The dielectric ceramic composition as claimed in claim 1 wherein $w = 0.0$.

5. The dielectric ceramic composition as claimed in claim 1 wherein $z = 0.0$.

6. The dielectric ceramic composition as claimed in claim 5 wherein x and y are molar fractions of respective components with values within the following respective ranges:

about $0.270 \leq x \leq$ about 0.40; and about $0.05 \leq y \leq$ about 0.15.

7. The dielectric ceramic composition as claimed in claim 6 wherein M is at least one metal selected from the group consisting of Sr, Ca, Al, Na, Ni, Sm, Nd, and Mn.

8. The dielectric ceramic composition as claimed in claim 7 wherein M is Mn.

9. The dielectric ceramic composition as claimed in claim 5 wherein $w = 0.0$.

10. The dielectric ceramic composition as claimed in claim 1 wherein z is a molar fraction with a value within the following range:

$0.0 < z \leq$ about 0.10.

11. The dielectric ceramic composition as claimed in claim 10 wherein x, y, and z are molar fractions of respective components with values within the following respective ranges:

about $0.270 \leq x \leq$ about 0.40; about $0.05 \leq y \leq$ about 0.15; and
about $0.05 \leq z \leq$ about 0.08.

12. The dielectric ceramic composition as claimed in claim 11 wherein M is at least one metal selected from the group consisting of Sr, Ca, Al, Na, Ni, Sm, Nd, and Mn.

13. The dielectric ceramic composition as claimed in claim 12 wherein M is Mn.

14. The dielectric ceramic composition as claimed in claim 10 wherein $w = 0.0$.

15. A system of dielectric ceramic compositions comprising at least two different dielectric ceramic compositions, each dielectric ceramic composition possessing dielectric properties advantageously adapted for a different microwave application and consisting essentially of a mixture represented by the general formula:

$$BaTi_{4-w}M_wO_9\text{-}xZn_2TiO_4\text{-}yBaO\text{-}zTa_2O_5$$

wherein M is at least one metal and $0.0 \leq w \leq$ about 0.05 and wherein x, y, and z are molar fractions of respective components with values within the following respective ranges:

$0.0 \leq x \leq$ about 0.45; about $0.01 \leq y \leq$ about 0.20; and $0.0 \leq z \leq$ about 0.10.

16. The system as claimed in claim 15 wherein M is at least one metal selected from the group consisting of Sr, Ca, Al, Na, Ni, Sm, Nd, and Mn.

17. The system as claimed in claim 15 wherein $w = 0.0$.

* * * * *